United States Patent

[11] 3,546,379

[72] Inventor James G. S. Chua
Roselle, Illinois
[21] Appl. No. 685,647
[22] Filed Nov. 24, 1967
[45] Patented Dec. 8, 1970
[73] Assignee Admiral Corporation
Chicago, Illinois
a corporation of Delaware

[54] DC COUPLED HYBRID AMPLIFIER
6 Claims, 2 Drawing Figs.

[52] U.S. Cl. 178/7.3, 330/149
[51] Int. Cl. H04n 5/16
[50] Field of Search 178/7.3(E), 7.5(E); 330/149, 3; 307/316

[56] References Cited
UNITED STATES PATENTS

| | | | |
|---|---|---|---|
| 2,881,267 | 4/1959 | Van De Weg | 330/3 |
| 3,042,877 | 7/1962 | Barnes | 330/149 |

*Primary Examiner*—Robert L. Griffin
*Assistant Examiner*—Anthony H. Handal
*Attorney*—Nicholas A. Camasto

ABSTRACT: A hybrid color television receiver having a d.c. coupling between a low B+ operated transistor video amplifier and a high B+ operated vacuum tube video amplifier. The high B+ voltage is coupled to the plate terminal of the vacuum tube and the low B+ voltage is coupled to the collector terminal of the transistor and the grid and cathode terminals of the vacuum tube to provide constant cathode to grid bias potential notwithstanding spontaneous fluctuation in either B+ voltage source.

PATENTED DEC-8 1970 3,546,379

INVENTOR.
James G.S. Chua
BY Nicholas A. Camasto
ATTY.

DC COUPLED HYBRID AMPLIFIER

This invention pertains to color television receivers, and in particular, to color television receivers utilizing both transistors and vacuum tubes. More particularly, the invention is concerned with providing a DC coupling between such "-hybrid" circuitry, which will not be affected by fluctuations in the dissimilar voltage sources used to supply the transistor and the vacuum tube.

The advent of the transistor has revolutionized modern electronics. For reasons of economy, quality and reliability, transistors now appear in innumerable electric products. Following this trend, the television industry utilizes transistors wherever it is expedient to do so. However, in situations where relatively high voltages are present, where there is a danger of excessive current surges and where wide ranges of temperatures exist, transistors become very costly and it is still desirable to use vacuum tubes.

Television circuitry (and color television circuitry in particular) requires high voltage for operation of the picture tube. Consequently, the picture tubes are susceptible to internal flashovers and such arcing may result in excessive currents tolerable only by the most expensive transistors. As a result, a hybrid chassis utilizing both transistors and vacuum tubes has been developed.

Such hybrid chassis, though they solve many problems, create many problems also. In particular, it becomes necessary to produce a relatively low B+ voltage source to supply the transistors in addition to a relatively high B+ voltage source to supply the vacuum tubes. It is not uncommon for these low voltage, high current B+ voltage sources to fluctuate independently as a result of random changes in their individual loads. A particular problem arising from this situation occurs in attempting to hybridize the video amplifier circuit in a color television receiver. The video amplifier circuitry especially exemplifies the problem since there is generally a brightness control associated therewith Consequently, fluctuations in the dissimilar voltage supplies will give rise to brightness changes perceptible on the picture tube. In the instant circuit, the brightness control controls the conduction current in the vacuum tube to set the DC level of the video signal fed to the picture tube. Since in color, the DC level of the video signal is important if true color rendition is to be achieved, the circuitry from the video detector to the picture tube must be capable of passing both the AC and DC portions of the video signal. Thus, the transistor stage (fed from one B+ source) and the tube stage (fed from the other B+ source) must be DC coupled and fluctuations in B+ voltages will not "track", with the undesirable result of brightness changes occurring in the picture tube. The circuit of the invention provides a solution to this problem.

The DC coupling requirement in the video amplifier chain has also presented problems in current "all tube" circuitry, especially when the brightness control is considered. In one common color television circuit, signal coupling between the two stages of the video amplifier is achieved by a relatively complex circuit which attenuates the video signal somewhat. The video signal output of the first stage is applied to a voltage divider, which primarily affects the DC and hence serves as a brightness control, which is bypassed by a capacitor. The magnitude of the DC portion of the signal is decreased as a result of the voltage divider, and the magnitude of the AC portion, especially at low frequencies, is decreased as a result of the capacitor.

The circuit of the invention avoids these and other limitations in the circuits of the prior art while allowing the benefits of hybridization.

Accordingly, the primary object of this invention is to provide means for DC coupling amplifiers which are supplied by dissimilar voltage sources, such that undesired fluctuations in either of these sources without a similar change in the other will not appear to be a change in the DC level of the video signal which is passed through the amplifiers.

Another object of this invention is to provide means for DC coupling amplifiers supplied by dissimilar voltage sources which minimizes signal attenuation.

Another object of this invention is to provide a hybrid color television receiver with a brightness circuit which is relatively unaffected by fluctuations in B+ voltages.

A feature of this invention resides in circuitry by which objectionable hum voltages created in the low B+ voltage source are neutralized in the hybridized amplifier.

Other objects and features of the invention will be apparent upon examination of the following description when read in conjunction with the accompanying drawing.

Figure 1:
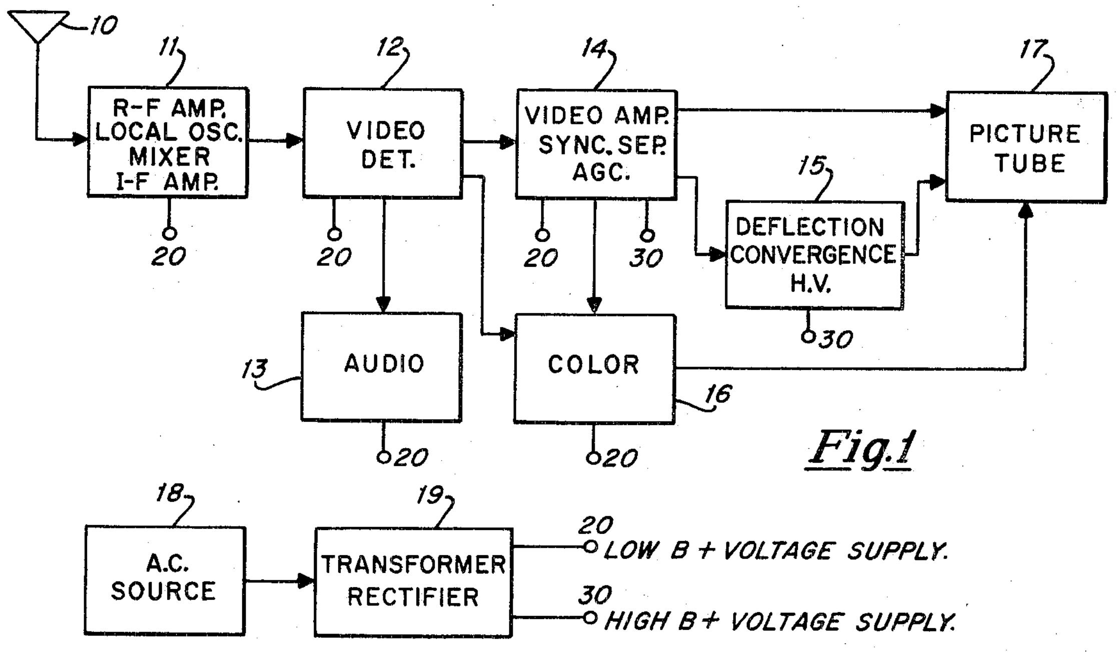
FIG. 1 is a simplified block diagram of a hybrid color television receiver.

Referring to FIG. 1, an antenna 10 receives transmitted television signals and couples them to block 11 which may contain an RF amplifier, a local oscillator, a mixer and an IF amplifier. The RF amplifier selectively amplifies one of the received television signals. The local oscillator, commonly tuned with the RF amplifier, generates a signal of such frequency that, when it is combined with the RF signal in the mixer, a signal of fixed frequency, called the IF signal, results. The IF amplifier amplifies this IF signal.

The amplified IF signal is then coupled to block 12 including a video detector which demodulates the IF signal to produce a composite signal containing monochrome-synchronizing and video information as well as color-synchronizing and video information. A portion of this composite signal is coupled directly to the color circuitry in block 16 where it may be applied to color burst takeoff circuitry from which information concerning frequency and phase of the color subcarrier is obtained. Block 12 may also contain audio detector circuitry. Audio information is coupled to block 13 which may contain conventional audio circuits for reproducing the sound portion of the televised program.

The monochrome video and synchronizing information is coupled to block 14 which may contain a video amplifier, a sync separator and AGC circuitry. The sync separator circuitry in block 14 separates the synchronizing signal information from the composite signal and couples it to block 15. Block 15 may contain vertical and horizontal deflection circuitry, high voltage circuitry and dynamic convergence circuitry. These various circuits in block 15 are coupled to a color picture tube 17.

The AGC circuitry in block 14 detects the level of the synchronizing signal and develops a DC control voltage for varying the gain of the RF amplifier and the IF amplifier. Also in block 14, the monochrome video information is separated from the modulated color signal information and coupled to the picture tube. The modulated color-synchronizing information in block 14 is coupled to block 16, which may contain color-synchronization circuitry and chrominance circuitry. The chrominance circuitry functions, under control of the color-synchronizing circuitry, to demodulate and amplify the color signal which is then coupled to the picture tube where the monochrome video and color signals are combined to produce a color picture.

An ordinary AC source 18 is coupled to block 19. Block 19 may contain a transformer with a high voltage winding and a low voltage winding and rectifying circuitry for converting the AC source voltage to a low B+ voltage supply 20 and a high B+ voltage supply 30. The low B+ voltage supply provides voltage to blocks 11, 12, 13, 14 and 16. The high B+ voltage supply provides voltage to blocks 14 and 15.

Figure 2:
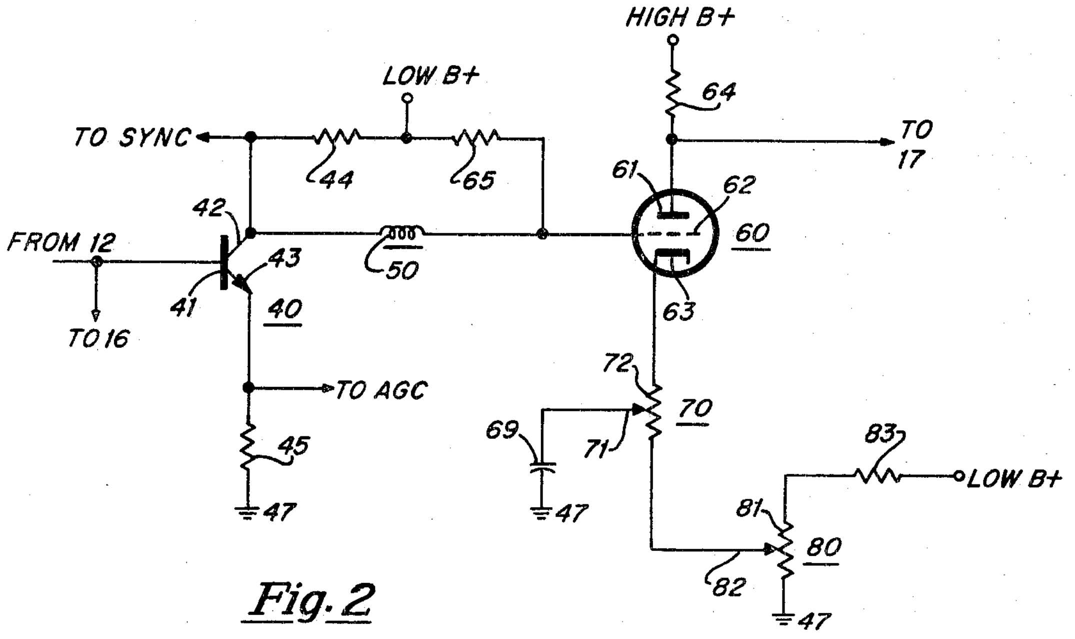
FIG. 2 is a circuit diagram of a portion of the hybrid color television receiver of FIG. 1.

Referring now to FIG. 2, a transistor 40 including a base electrode 41, a collector electrode 42 and an emitter electrode 43, receives the detected video signal from block 12. An emitter resistor 45 is connected between emitter electrode 43 and a point of reference potential 47. The emitter electrode is also coupled to the AGC circuitry in block 14. Low B+ voltage supply 20 is coupled to collector electrode 42 through a load resistor 44. The collector electrode is also coupled to the sync separator in block 14. A vacuum tube 60 includes a plate electrode 61, a grid electrode 62 and a cathode electrode 63. Collector electrode 42 is coupled to grid electrode 62 through a delay line 50. Low B+ voltage supply 20 is coupled to grid electrode 62 through resistors 65 and 44 and also to resistor 83. Resistor 83 is coupled to resistor 81, which in conjunction with a tap 82, comprises a brightness control 80. The other terminal of resistor 81 is connected to reference potential 47.

A contrast control 70, comprising a resistor 72 and a movable tap 71, its upper terminal connected to cathode 63 30 vacuum tube 60 and its lower terminal connected to tap 82 on control 80. Tap 71 is bypassed to reference potential 47 through a large bypass capacitor 69. High B+ voltage supply 30 is coupled to plate terminal 61 through load resistor 64. Plate terminal 61 is also coupled to picture tube 17.

The video signal emerges at the output of video detector 12. This signal contains luminance, i.e. monochrome information, burst information and hue and saturation information. The hue and saturation information, which is still in modulated form, and burst information, is coupled to chrominance circuitry, included in block 16. The luminance signal must be amplified and two stages of amplification are provided for this purpose. The luminance signal is presented to base electrode 41 of transistor 40. Transistor 40, operating as an amplifier, increases the video signal approximately by a factor of 5. Low B+ voltage supply 20 provides the necessary voltage to transistor 40. The amplified video signal appears at collector electrode 42 and is passed along delay line 50 to grid electrode 62 of vacuum tube 60.

The purpose of the delay line is to retard the luminance signal so that it and the color information will arrive at the picture tube at the same time. Since the color information signal passes through a relatively narrow band-pass filter, it is significantly retarded. The delay line serves to retard the luminance signal by a like amount. Since the transistor and the vacuum tube are directly coupled through low impedance delay line 50, the luminance signal is not significantly attenuated. It is, of course, not necessary for the delay line to be connected between the amplifier stages; it may be inserted anywhere in the circuit where it will retard the luminance signal; therefore the DC coupling may consist solely of a wire connection.

Vacuum tube 60, also operating as an amplifier, comprises the second stage of the video amplifier and increases the luminance signal approximately by a factor of 30. High B+ voltage supply 30 provides the necessary plate voltage. It will be seen that grid bias voltage is provided by low B+ voltage supply 20. The positive potential at the plate electrode (with respect to the cathode electrode) provided by high B+ voltage supply 30 and the potential at the grid electrode (with respect to the cathode electrode) provided by low B+ voltage supply 20, determines the quiescent operating point of the vacuum tube. Associated with this quiescent operating point is a quiescent plate current. Changes in the quiescent operating point, due to shifts in DC biasing potential, are of course reflected in corresponding changes in the plate current.

For normal tube operation, the grid to cathode potential should be negative. This negative potential is achieved by coupling low B+ voltage supply 20 to both the grid electrode and the cathode electrode, and selecting resistors 65-45 and 83-80 such that low B+ voltage supply 20 provides the cathode with more B+ voltage than the grid. In this way also, transistor amplifier 40 may be directly coupled to vacuum tube 60 without fluctuations in either B+ voltage supply significantly affecting the plate current. For example, if a fluctuation occurs in low B+ voltage supply 20 but not in high B+ voltage supply 30, the plate current will be substantially unchanged, since a portion of the fluctuation in low B+ voltage supply 20 appears at the grid electrode and a portion of the fluctuation appears at the cathode electrode. Depending upon the values of resistors 65, 45, 83 and the position of the tap on brightness control 80, these portions will be very nearly equal. Since the fluctuations appearing at the grid electrode and the cathode electrode are very nearly equal, there is very little change in relative potential between the grid electrode and the cathode electrode. Consequently, there is very little change in plate current and little change in brightness of the picture tube which is fed from vacuum tube 60.

Brightness control 80 is used to change the relative potential between the grid electrode and the cathode electrode of tube 60. This is done by moving tap 82 along resistor 81 to change the DC voltage at the cathode with respect to reference potential 47, which causes a proportional change in the plate current. Since plate electric electrode 61 is coupled to the cathode electrode of the picture tube in block 17, changes in plate current are communicated thereto. This results in a change in beam current in the picture tube and consequent change in brightness thereof.

Contrast control 70, by virtue of its being bypassed for signal frequencies, has little effect on the DC condition of tube 60. Its purpose is to effect the signal gain of the tube and thereby change the magnitude of video signal excursions. On the other hand, as has been seen, brightness control 80 substantially affects the DC condition of tube 60 and has little effect on the AC signal gain.

Occasionally, objectionable hum voltages due to the low voltage, high current nature of low B+ voltage supply 20 are produced. (High current supplies are difficult to filter economically.) These hum voltages interfere with proper set operation and are particularly objectionable in the video circuitry. It is therefore desirable to minimize them as much as possible. Connecting low B+ voltage supply 20 to both grid 62 and cathode 63 of vacuum tube 60, presents the hum voltages in the low B+ voltage supply to both electrodes. Since amplification depends upon the relative potential between grid and cathode, the hum is in effect neutralized.

I claim:

1. A hybrid color television receiver including: a picture tube for displaying an image; a transistor having a collector electrode, a base electrode and an emitter electrode; a resistor connected between said emitter electrode and a reference potential; a vacuum tube having a plate electrode, DC coupled to said picture tube, a grid electrode and a cathode electrode; a delay line directly connected between said collector electrode and said grid electrode; a first resistor, a second resistor, a third resistor and a fourth resistor; a low B+ voltage supply and a high B+ voltage supply; said low B+ voltage supply being subject to voltage fluctuations independent of said high B+ voltage supply; said low B+ voltage supply being coupled to said collector electrode through said first resistor, and to said grid electrode through said second resistor; said high B+ voltage supply being coupled to said plate electrode through said third resistor; a brightness potentiometer; said fourth resistor coupled between said low B+ voltage supply; said brightness potentiometer having a brightness tap and connected between said brightness potentiometer and said fourth resistor and said reference potential; a contrast potentiometer, having a contrast tap, connected between said brightness tap and said cathode electrode; a bypass capacitor coupling said contrast tap to said reference potential; means supplying a composite video signal containing both AC and DC components to said base electrode, said composite video signal being amplified in said transistor, passed through said delay line and appearing at said grid electrode; said composite video signal being further amplified by said vacuum tube, and coupled to said picture tube; said brightness potentiometer changing the potential of said cathode electrode with respect to said reference potential for changing the magnitude of said DC component which affects the brightness of said image; and said fluctuations in said low B+ voltage supply appearing at both said grid electrode and said cathode electrode and being substantially canceled to preclude changing said DC component responsive thereto.

2. A hybrid television receiver as set forth in claim 1, wherein the connection of said low B+ voltage supply to said grid electrode and to said brightness control also results in cancellation of power supply hum components likely to occur in said B+ supply.

3. A hybrid amplifier comprising: a transistor having a collector and a vacuum tube having a plate, a grid and a cathode; means DC connecting said collector to said grid; a first source of DC voltage; a second higher source of DC voltage; a pair of load resistors respectively connecting said first source to said collector and said grid; coupling means coupling said first source to said cathode; and another load resistor connecting said second source to said plate, the DC potential appearing across said grid and said cathode being determined by the DC potential at said collector and by said coupling means and remaining substantially constant despite variations in said first source voltage.

4. The hybrid amplifier of claim 3, wherein said coupling means comprises a voltage divider having a movable tap connected to said cathode for controlling the bias level of said tube.

5. A television receiver including: a picture tube displaying a video image; a video amplifier driving said picture tube and comprising a transistor having a collector and a vacuum tube having a plate, a grid and a cathode; means DC coupling said collector to said grid; a first source of B+ voltage, a second higher source of B+ voltage; a potentiometer connected between said first source and said cathode for controlling the brightness of said picture tube by regulating the DC bias across said grid and said cathode; a pair of resistors respectively connecting said first source to said collector and to said grid; and said second source being connected to said plate whereby the brightness of said picture tube remains substantially constant despite voltage variations in said first source.

6. The television receiver of claim 5 further including a variable signal bypass control connected between said cathode and said potentiometer for providing control of the gain of said vacuum tube and hence, the contrast of said video image.